Aug. 26, 1969  R. G. GIDLOW  3,462,849
FREEZE-DRYING OF POROUS MATERIALS DURING STORAGE
Filed Oct. 9, 1967  3 Sheets-Sheet 2
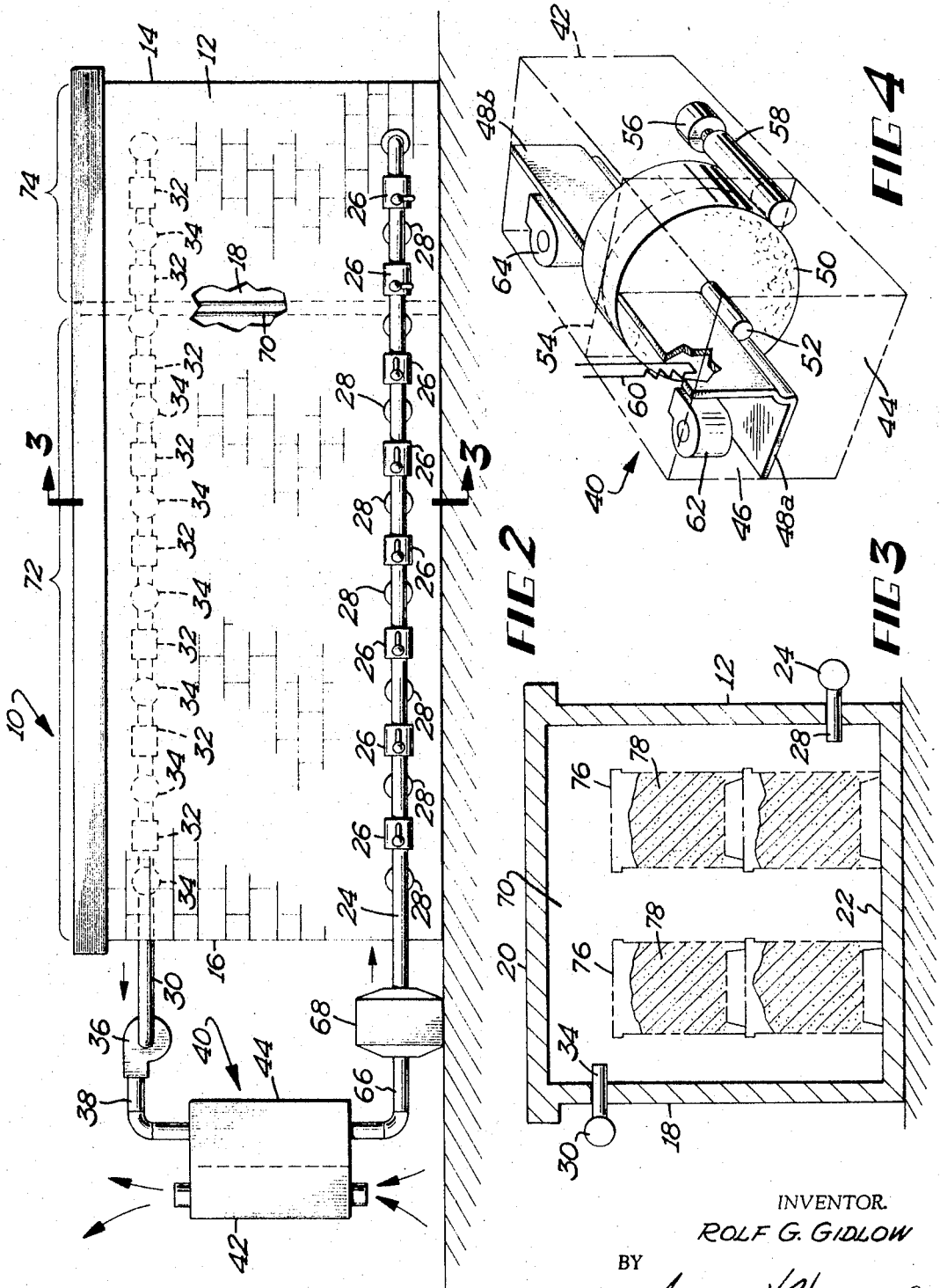
INVENTOR.
ROLF G. GIDLOW
BY
James V. Harmon
ATTORNEY

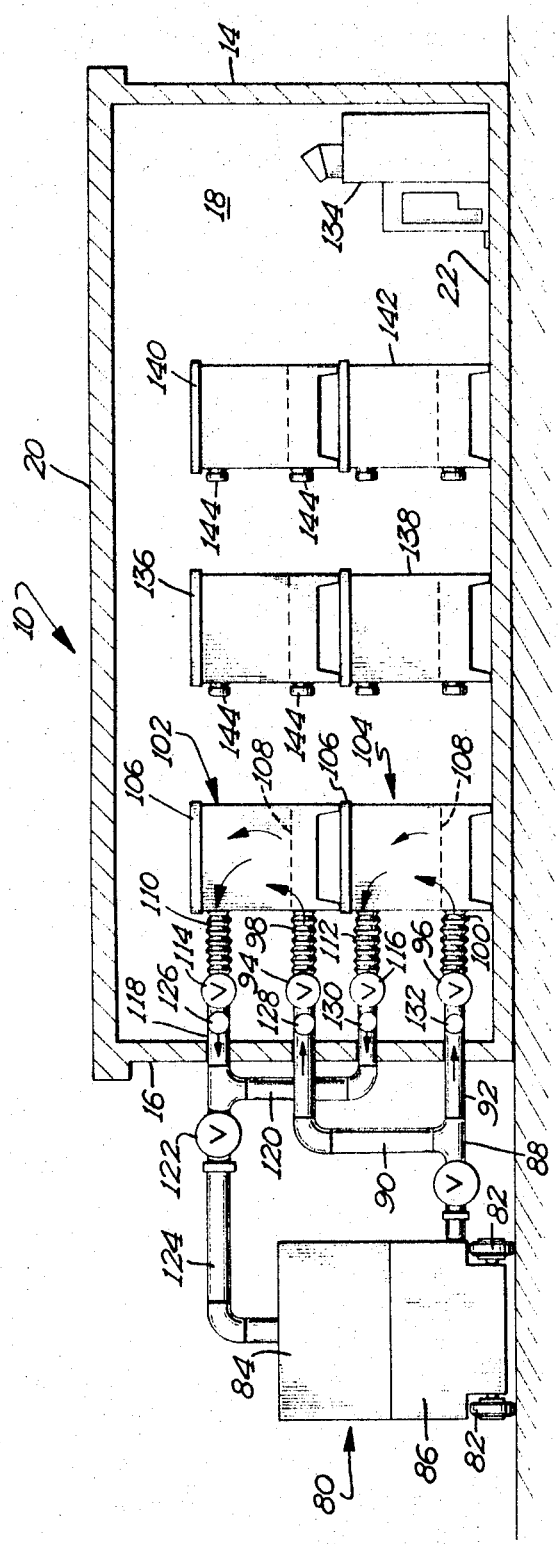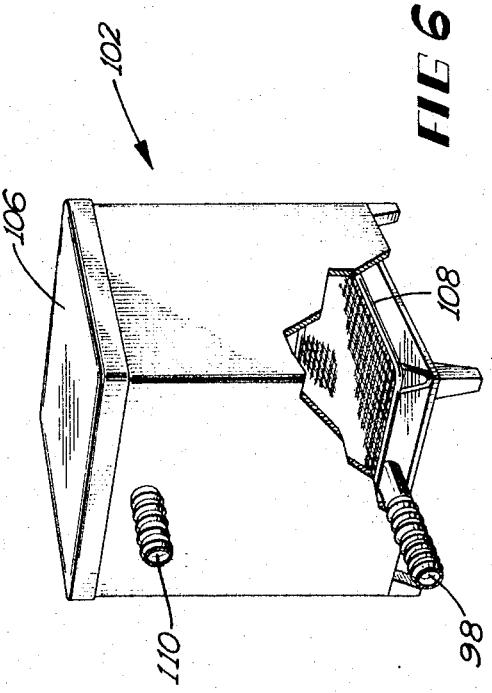

United States Patent Office 3,462,849
Patented Aug. 26, 1969

3,462,849
FREEZE-DRYING OF POROUS MATERIALS
DURING STORAGE
Rolf G. Gidlow, North St. Paul, Minn., assignor to The Pillsbury Company, Minneapolis, Minn., a corporation of Delaware
Filed Oct. 9, 1967, Ser. No. 673,593
Int. Cl. F26b 5/00, 21/14
U.S. Cl. 34—5                                   20 Claims

ABSTRACT OF THE DISCLOSURE

A process for freeze-drying substances such as foods while in storage within a refrigerated warehouse by chilling the products to a temperature between −20° F. and +30° F. and circulating chilled air through the warehouse and through a dryer for reducing the humidity level of the air to maintain its dew point at a temperature below the temperature of the chilled product. The air is maintained at a low enough temperature to prevent melting of the product. Drying is continued for a period of days or weeks throughout the normal storage period of the frozen product. When the moisture content has reached the desired level, the product can be placed in storage at ambient temperatures.

---

The present invention is a process and apparatus for freeze-drying materials such as foods, biological materials, pharmaceuticals and chemicals while in frozen storage.

Prior freeze-drying processes require a substantial capital investment and are expensive to operate. In prior vacuum freeze-drying processes, the frozen material is first placed in a chamber. The chamber is then evacuated and drying proceeds by sublimation. The heat of sublimation is frequently provided by placing the material on heated shelves in the drying chamber. Water vapor is removed either by steam ejectors or by any refrigerated condenser backed by a mechanical vacuum pump.

Each piece being dried consists of a frozen nucleus, the surface of which recedes toward the center of each piece as drying proceeds and becomes surrounded by a porous insulating layer of dried material. The insulating layer of porous material acts as a barrier for the heat required to sublimate the moisture remaining in the center. As the process proceeds, the pieces assume an equilibrium condition in which the rate of heat input balances the heat of sublimation of the outflowing vapor. The ice temperature will rise if the heat input is increased until its vapor pressure becomes larger than the vapor pressure of the surrounding atmosphere thus releasing the frozen moisture in vapor form. The porous layer is a highly efficient thermal insulator and therefore drastically limits the heat transfer rate. As a result, under optimum conditions, it often requires somewhat more than 24 hours of drying time under high vacuum to dry a piece of meat of about one inch in thickness. In most freeze-drying processes the drying operation is carried out under a partial vacuum of on the order of about .5 to 2 millimeters of mercury absolute pressure.

The equipment used in vacuum freeze-drying is expensive because of the requirement for vacuum pumps, pressure-resistant processing chambers and special pressure-resistant doors. Moreover, the introduction and removal of the product from the treatment chamber is both time-consuming and inconvenient. Thus, in spite of the superior quality of the products obtained by freeze-drying, the adoption of this process is often limited by relatively high processing and equipment costs.

As a cost-saving measure it has been previously proposed to carry out freeze-drying at atmospheric pressure. While vacuum chambers are not needed, specialized equipment is still required for atmospheric freeze-drying and the problem of introducing and removing food products from the dryer also involves substantial inconvenience and expense. In present atmospheric freeze-drying processes, an effort is made to reduce the processing time to about 24 hours or less so that the capacity in pounds per hour will justify the substantial capital investment required. In spite of these efforts the processing time is often substantially over 24 hours and the investment in equipment is almost as great as that required for the higher capacity vacuum freeze-drying equipment.

In freeze-drying processes previously proposed for operation at atmospheric pressure, frozen food products are placed on trays which are carried or otherwise transported to a drying chamber maintained at about 0° F. The drying chamber is chilled by circulating a cooling medium through its walls to maintain the temperature of the food material at about −5° F. to +5° F.

The temperature of the ice within the pieces being dried is governed primarily by the carrier gas temperature and the exit temperature of the carrier gas is a reasonable approximation of the product ice temperature. In this prior process it is not difficult to obtain levels of 90% water removal at the end of about 24 hours but it is almost impossible to obtain a final product having the desired level of dryness (about 2% moisture).

In view of these and other deficiencies of the prior art, the present invention has among its objects the provision of an improved freeze-drying process for porous products with the following characteristics and advantages: (a) the ability to carry out a drying operation on porous products such as foods with a minimum investment of capital equipment; (b) the utilization of a frozen product warehouse storage area for the drying chamber used in the drying operation; (c) enabling any warehouse storage area to be easily converted for drying food products stored therein during the normal storage period of the food product and (d) conducting the freeze-drying operation at a temperature and pressure which is normal for the storage area that is utilized.

In accordance with the present invention and in contrast with the prior art there is provided an efficient and highly economical process of freeze-drying products while they are normally held in frozen storage. The present invention makes use of a relatively low-humidity drying medium maintained at substantially atmospheric pressure and uses existing frozen storage facilities as the drying chamber. By utilizing warehouse storage space, it is possible to achieve substantial economies not only through the elimination of equipment previously believed necessary but also in a reduction of the handling steps needed for introducing and removing the food products from the dryer.

Very briefly, in accordance with the present invention a refrigerated warehouse storage area that is to be used for processing the product is maintained at a temperature below freezing and preferably on the order of from about −20° F. to +10° F. A product drying compartment is provided within the warehouse storage area and the food products that are to be dried are placed in the drying compartment. A drying atmosphere which ordinarily consists of air having a low humidity level is conveyed to the drying compartment and allowed to pass through the drying compartment in heat and mass transfer relationship with the food pieces in storage. The drying atmosphere is preferably introduced and removed through existing ducts such as sheet metal headers. In one form of the invention, a portion of the warehouse is segregated from the remaining portion by means of either a movable or fixed wall. In another form of the invention, the product is kept within portable storage bins provided with imperforate walls and the drying atmosphere is passed continuously through each bin. While the invention is useful in connection with a great variety of products, it is particularly useful with food products or products which are frozen during some phase of processing and which must be stored for a time before being dried. Examples are seasonal food products such as fresh uncooked vegetables, berries and fruits.

These and other more detailed and specific objects will become apparent from the following description of the invention and drawings wherein:

FIGURE 2 is a semi-diagrammatic side elevational view of a warehouse embodying the invention.

FIGURE 3 is a transverse sectional view taken on line 3—3 of FIGURE 2.

FIGURE 4 is a perspective view of the air desiccating unit employed in the apparatus of FIGURES 1 and 2.

FIGURE 5 is a semi-diagrammatic vertical sectional view of another form of the invention.

FIGURE 6 is a perspective view of a portable storage container of the type shown in FIGURE 5 on an enlarged scale.

Figure 1:
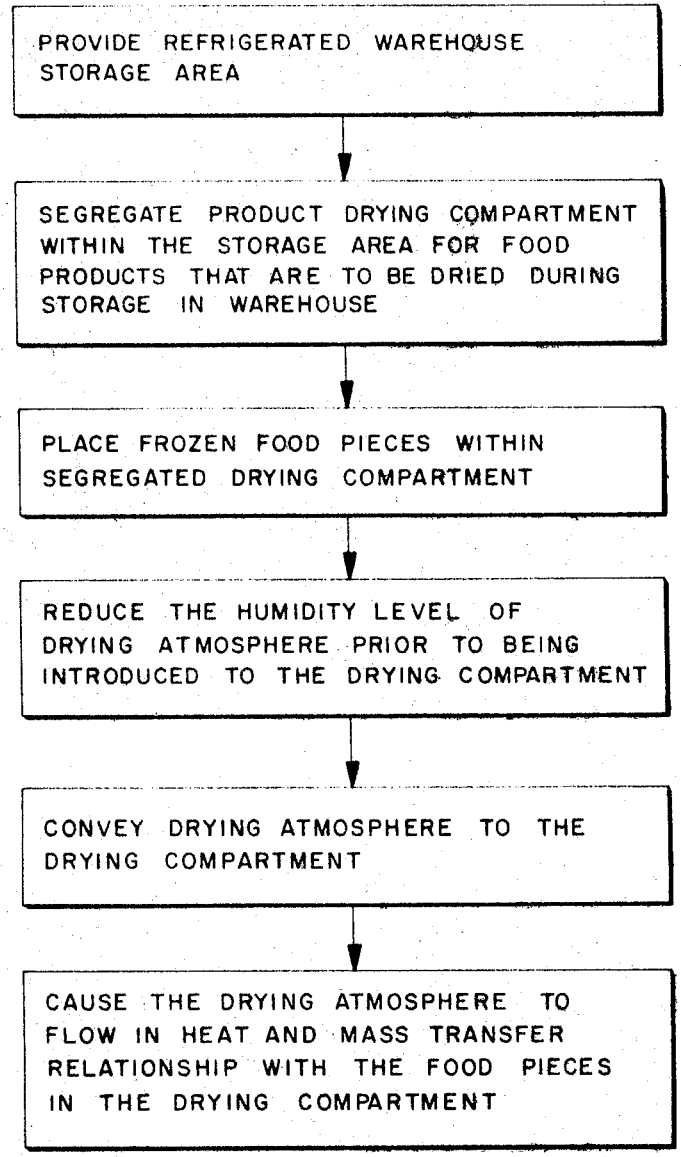
FIGURE 1 is a flow chart illustrating the steps performed in accordance with one preferred form of the invention.

The invention will now be described with reference to FIGURE 1. Since many food products are presently harvested and processed within a period of only a few weeks each year, if frozen they must be stored for the remainder of the year and sometimes even more than a year in large frozen food warehouses. In accordance with the present invention all or a portion of the warehouse is utilized for dehydrating the stored products while in a frozen state. Consequently, the time period required for drying these products is of little importance. These results are accomplished by circulating this low humidity drying atmosphere through the frozen stored product for a sufficient period of time to effect the removal of ice by sublimation until a dried product is obtained.

In one form of the invention only a portion of a conventional frozen food storage warehouse is utilized for dehydration. The frozen product in the case of fruits and vegetables is preferably stored in this portion of the warehouse in portable containers or bins which permit the free flow of gases from the warehouse through the product. In one form of the invention, the food products are stored in movable imperforate bins which are connected directly to ducts that force a desiccating gas through the product.

In another form of the invention the frozen product is spread thinly on a plurality of horizontally disposed vertically spaced shelves.

As a first step in the present process, food products are chilled to a temperature generally between about −20° F. and +10° F. Temperatures from as low as −100° F. or less to +30° F. can be employed depending upon the product that is to be dried and the method of freezing. The chilled product is then placed in a drying enclosure unless frozen within the enclosure itself. The enclosure can consist of an entire waerhouse storage area or an imperforate portable storage bin. The drying atmosphere, which can consist of desiccated air, nitrogen, carbon dioxide or other gas in then passed through the stored food product.

Theoretical considerations indicate by using air of −50° F. dew point and at a temperature of +4° F., the ice surface will be maintained at about 0° F. Under these conditions a total of 1150 lbs. of air is required to remove 1 lb. of water vapor. When the ice surface is maintained at +20° F., the amount of air supplied at +32° F. would be reduced to about 450 lbs. per pound of water removed. This demonstrates that practical operation conditions can be used to satisfy the material and heat balance criteria.

In accordance with the present invention, the drying atmosphere surrounding the food particles is maintained at a moisture level below saturation so that the ice core is not in equilibrium with its surrounding environment. During the process, heat is transferred to the ice core from the surrounding drying atmosphere and by radiation causing evaporation of moisture up to the saturation point of the surrounding atmosphere.

A variety of factors limit the rate at which drying takes place, among them being the temperature and humidity of the drying atmosphere, the temperature of the ice core, the diffusivity of the material and the mass transfer coefficient.

It can be shown that conventional vacuum freeze-drying rates are limited by the heat transfer while atmospheric freeze-drying rates are limited by the mass transfer. The transfer of heat in the vacuum process is limited by the absence of an atmosphere because the heat must initially be transferred by radiation to the surface of the material and by conduction of heat through the porous material to the ice core. Since no atmosphere is present to assist heat transfer, the heat must be transferred entirely through the porous peripheral layer. Since most food products are heat sensitive, they must not be heated to a temperature which is high enough to damage their surfaces. The temperature differential that can be used to facilitate the transfer of heat to the ice core is thus limited. This explains why the drying rate in vacuum freeze-drying is limited by the heat transfer rate.

In the present invention, the diffusion of vapor molecules through the pores of the surrounding peripheral dried layer limits the rate at which drying can take place. If the surrounding atmosphere is removed, the water will not encounter atmospheric gas molecules and accordingly diffusion will be more rapid. The primary reason for the lower drying rate at atmospheric pressure is that the driving force for vapor removal is less than in vacuum freeze-drying. Atmospheric drying in accordance with the present invention thus requires a substantially longer drying period but large quantities of product can be economically processed because the product is normally in storage at this time. Moreover, while vacuum freeze-drying requires equipment that is complex and expensive, atmospheric drying in accordance with the invention needs only a refrigerated enclosure with a blower to recirculate air through a desiccant bed for keeping the atmosphere dry.

Refer now to FIGURES 2–4 which illustrate one form of the invention in connection with the drying of frozen foods. As seen in the figures, a conventional warehouse 10 for frozen foods is adapted for use in connection with the invention. The warehouse 10 includes the usual walls 12, 14, 16 and 18, roof 20, floor 22 and refrigeration equipment (not shown). Doorways for introducing and removing the products that are to be dried are not shown. The warehouse 10 is provided with air inlet and outlet ducts comprising an inlet header 24 including a plurality of spaced shut-off valves 26 and a plurality of feed lines 28 which extend through the wall of the warehouse 10. It is through these feed lines 28 that the refrigerated desiccated air is introduced to the warehouse during the drying operation. Headers of a suitable construction will be available in some refrigerated plants and frozen food warehouses while in others the headers 24 and 30 will have to be added.

The exhaust header is designated 30 and includes a plurality of spaced shut-off valves 32 positioned between exhaust ducts 34 that extend through the wall 18. During operation, the desiccated air that is passed through the warehouse and has picked up moisture from the product as it dries passes from right to left as seen in FIGURE 2 through the header 30, through a blower 36, thence through duct 38 to an air desiccating unit 40.

While a variety of different forms of air desiccating units, either mechanical, i.e. those employing cooling coils or chemicals, can be used, a chemical-type desiccator is illustrated by way of example. Suitable chemical desiccants include silica gel, alumina and molecular sieves. The desiccator includes a housing 42 having an air drying compartment 44 and a desiccant regenerating compartment 46 which is separated from the air drying compartment 44 by means of a partition divided into two sections 48a and 48b, between which is provided a porous desiccant supporting drum 50 suitably mounted for rotation upon a vertically disposed shaft 52. Surrounding drum 50 in a position to prevent the flow of air around the sides of the drum is a horizontally disposed sealing partition 54. An electric motor 56 suitably connected to a driving cylinder 58 is positioned to contact the outside surface of drum 50 to cause it to rotate. It will thus be understood that during operation the humidified air that is to be dried passes through the drum 50 and into moisture transfer relationship with the desiccating agent therein (from right to left as seen in FIGURE 4). Simultaneously, air heated by means of heater 60 is forced by the blowers 62 and 64 (from left to right as seen in FIGURE 4) through the segment of the drum within the compartment 46.

The dried air is exhausted from the desiccating unit 40 through an exhaust duct 66. It then passes through a heat exchanger 68 of any suitable known construction where it is either cooled or warmed as required. The air fed to the bins is ordinarily held at the same temperature as the air in the warehouse which is usually about $+10°$ F. to $-20°$ F.

Referring particularly now to FIGURES 2 and 3, it will be seen that a movable partition 70 is provided within the warehouse to define a segregated product drying compartment 72 on the left-hand side thereof and it is in this drying compartment 72 that the food products that are to be dried are placed. The compartment 74 on the opposite side of the wall 70 can be used for the frozen storage of products that are not to be dried. Wall 70 can be fixed or can consist of a movable wall which is sealed to the side walls, ceiling and floor of the warehouse along its edges. It will be understand that the shut-off valves 26 and 32 to the right of the wall 70 will be closed and those on the left open so that the desiccating atmosphere will flow freely into the drying compartment 72.

As best seen in FIGURE 3, inside the compartment 72 are placed a plurality of bins formed from a perforated or porous material such as perforated sheet metal or a woven screen. Each of the containers 76 is filled with a frozen food product 78 that is present as pieces. During operation, the desiccating atmosphere is introduced through the feed lines 28, passes continuously through the warehouse and circulates freely through the interstices between the food pieces within the perforated storage containers 76. As this takes place, a dried porous layer will begin to form on the surfaces of each of the particles as the moisture contained in the frozen center portion of each piece is removed by sublimation.

Since the air supplies the heat necessary for sublimation of moisture, the temperature of the drying atmosphere is decreased as it passes from the inlet of the drying chamber to the outlet. As the air is cooled, its moisture content is increased. This results in a decreased driving force for both heat and mass transfer. It is important to note that in the present invention as distinguished from the prior art, the dew point of the incoming air can be any value below the product temperature since it is possible to allow sufficient time for adequate drying. As much as six months' time is available in many cases.

While the invention has general utility, it is particularly useful for drying raw food products such as peas, sliced carrots, shelled corn, green beans and potatoes sliced to french-fry-size pieces, i.e. ⅜-inch square strips. The invention is especially beneficial for drying a food product which is a bumper crop in a given year and is so plentiful that insufficient space is available for storage of next year's crop. In these circumstances the present invention can be used for drying a portion of the crop to free frozen storage space for the succeeding year's crop.

Refer now to FIGURES 5 and 6 which illustrate another embodiment of the invention. The warehouse 10 is the same as described above except that the wall 70 is not used. In the embodiment shown in FIGURES 5 and 6, the desiccating atmosphere is supplied by means of a mobile and portable combination air desiccating and heat exchange unit 80 which is mounted on wheels 82 so that it can be transported from one drying location to another as needed. The desiccating unit includes a desiccator assembly 84 which may be either the same as that described in connection with FIGURES 2–4 or a thermal desiccator of the type employing cooling coils. The mobile unit 80 includes a heat exchanger 86 of a suitable construction.

Air is exhausted from the mobile unit 80 through a duct 88. It then passes into ducts 90 and 92 which extend through the wall 16 and communicate through shut-off valves 94 and 96 respectively with flexible and extensible inlet lines 98 and 100 which are themselves connected to imperforate portable drying containers or bins 102 and 104 that will now be described.

The portable storage containers 102 and 104 each consist of an air-tight enclosure formed from an imporforate material defined by side walls, a bottom and a removable cover 106 through which the product is introduced and removed. The walls, cover and bottom of the bins can be formed from any suitable material such as sheet metal. The bins each include a perforate false bottom 108 upon which the product that is being processed rests.

When the equipment is in operation, the desiccated air passes into the bins 102 and 104 through the flexible inlet lines 98 and 100 respectively, thence upwardly through the perforate false bottom 108 through the passages between the pieces of products that are being dried. The moisture-laden air is then exhausted through ducts 110 and 112, then passes through shut-off valves 114 and 116, respectively, through lines 118 and 120, shut-off valve 122 and is returned to the inlet of the desiccating unit 80 through a return line 124. As described above in connection with FIGURES 2–4, the air is recycled continuously throughout operation from the stored product to the desiccator and back to the product. The drying atmosphere can be supplied and withdrawn from other similar containers through headers 126, 128, 130 and 132.

The temperature of the warehouse 10 is maintained by means of conventional well-known refrigeration equipment 134 which is operated conventionally as the products are being dried.

Other bins designated 136, 138, 140 and 142 are provided for the storage of frozen food products that are not to be dried. It should be noted that flexible ducts 98, 100, 110 and 112 have been removed and the openings have been sealed by covers designated 144 and in this instance it is the imperforate walls of the bins 102 and 104 which segregate the product drying compartment from the frozen food products storage compartments. The embodiment of the invention shown in FIGURES 5 and 6 has several advantages over that shown in FIGURES 1–4. First, the desiccating atmosphere is distributed more uniformly through the product being dried. Secondly, it is unnecessary to segregate certain portions of the warehouse from others to define the drying compartment. Accordingly, the system is more flexible with regard to the changes in the amount of product to be dried as compared with the amount to be stored under frozen conditions. Moreover, the portable desiccating and heat transfer unit 80 can be transported as required from one location to another to suit seasonal variations in the amount and kinds of food products that require drying. In addition, this system facilitates the use of gases other than air such as $N_2$, $CO_2$ or other inert gases which may be desirable in order to prevent oxidative reactions.

The invention is inexpensive to operate, requires a minimum of equipment and is highly effective in drying a variety of products to low levels of moisture. It was found, quite surprisingly, that prolonged exposure to atmospheric oxygen did not cause the food products to deteriorate to a detectable degree when dried in accordance with the invention.

The invention will be better understood by reference to the following examples.

EXAMPLE I

Cylinders were made of ice. The cylinders had the dimensions of approximately 3⅛ inch outside diameter, 1⅝ inch inside diameter and a height of 3.5 inches. These cylinders were placed in a Pyrex glass chamber and desiccated cold air was passed through and around the cylinder. The time required to sublime all of the ice was noted as well as the dew point range and the air temperature. The results are described in Table 1.

TABLE 1

| Initial wt., grams | Air temp., °F. | Dew point, °F. | Drying time, hours |
|---|---|---|---|
| 215.2 | 0 | −100 to −60 | 70 |
| 260.8 | 0 to +14 | −45 to −40 | 79 |
| 262.4 | +25 | −50 to −30 | 42 |

EXAMPLE II

Frozen cylinders were made of 25% solution of gelatin in water. The cylinders were of the same approximate dimensions as in previous Example I. The weight loss, dew point, air temperature and drying time are presented in Table 2.

TABLE 2

| Initial wt., grams | Final wt., grams | Air temp., °F. | Dew point, °F. | Drying time, hours |
|---|---|---|---|---|
| 310 | 99.7 | +3 | −110 to −40 | 738 |
| 343.9 | 136.7 | +18 to +24 | −95 to −40 | 463 |

The dried cylinders were of a highly porous nature typical of freeze dried structures and rehydrated readily in water.

EXAMPLE III

Frozen cut green beans of commercial grade were placed in a wire mesh container 4 inches diameter and 10 inches high. They are then processed in the same manner as described in the previous examples. Table 3 presents the results obtained.

TABLE 3

| Initial wt., grams | Final wt., grams | Air temp., °F. | Dew point, °F. | Drying time, hours |
|---|---|---|---|---|
| 781.1 | 384.0 | 0 to +12 | −95 to −30 | 493 |
| 783.1 | 369.9 | −4 to 0 | −90 to −30 | 1,269 |

Upon rehydration in water the color and shape was completely restored and the beans had excellent flavor and texture.

EXAMPLE IV

Fresh potatoes were cut into a solid cylinder of ⅜-inch diameter and of random lengths and were then frozen. They were processed in the same manner as the beans in Example III. The results are shown in Table 4.

TABLE 4

| Initial wt., grams | Final wt., grams | Air temp., °F. | Dew point, °F. | Drying time, hours |
|---|---|---|---|---|
| 658.7 | 314.8 | +4 to +8 | −78 to −50 | 248 |
| 644.7 | 297.4 | +2 to +4 | −50 to −45 | 868.75 |

The dried potato cylinders rehydrated readily in water.

Many variations can be made in the invention. One such variation is to employ conventional vacuum freeze-drying for a period of time prior to the present method to bring the moisture level to about 10% of its original level. This procedure makes use of the conventional vacuum freeze-drying process during its most efficient phase and relatively slow drying rates realized during the last portion of the process are accomplished effectively at a reasonable cost.

It is apparent that other modifications and variations of this invention as hereinbefore set forth may be made without departing from the spirit and scope thereof. The specific embodiments described are given by way of example only and the invention is limited only by the terms of the appended claims.

I claim:

1. A process for freeze-drying products having a thickness in at least one direction of less than about one-half inch at substantially atmospheric pressure comprising, providing a refrigerated warehouse for storing chilled products that contain moisture, said warehouse having walls, a roof, a floor and a product drying compartment within the warehouse for products that are to be dried during storage, placing the products within the drying compartment, maintaining the products at a temperature which is sufficiently low to prevent melting, providing a drying atmosphere, reducing the humidity level of the drying atmosphere to maintain its dew point at a temperature below the temperature of the chilled products, maintaining the temperature of the drying atmosphere sufficiently low to prevent melting of the products, conveying the drying atmosphere to the drying compartment and causing the drying atmosphere to flow in heat and mass transfer relationship with the products in the drying compartment whereby the frozen products are dried during their storage period within the storage warehouse.

2. The process according to claim 1 wherein the products comprise frozen food products and wherein said food products are chilled prior to being placed within said drying compartment.

3. The process according to claim 1 wherein the products comprise pharmaceutical products.

4. The process according to claim 1 wherein the product drying compartment comprises a bin having imperforate walls and a duct means for introducing and removing the drying atmosphere from the bin.

5. The process according to claim 1 wherein the drying compartment is segregated by means of a wall provided in the warehouse and sealed along its edges to the walls, floor and roof of the warehouse.

6. The process according to claim 1 wherein the compartment comprises a portion of the warehouse with a dividing wall between said portion and a second compartment containing products maintained in frozen storage.

7. The process of claim 1 wherein the temperature of the drying atmosphere is between about −20° F. and +32° F.

8. The process according to claim 1 wherein the dew point of the drying atmosphere is maintained between about −150° F. and −30° F.

9. The process according to claim 1 wherein the drying atmosphere is air.

10. The process according to claim 1 wherein the drying atmosphere is nitrogen.

11. The process according to claim 1 wherein the drying atmosphere is carbon dioxide.

12. The process according to claim 1 wherein the drying atmosphere is continuously recirculated in a closed loop through the drying compartment and the humidity level of the drying atmosphere is reduced while it is recirculated.

13. The process according to claim 12 wherein the drying atmosphere is cooled as it circulates.

14. The process according to claim 12 wherein the drying atmosphere is heated as it circulates.

15. A warehouse for storing and drying frozen products, said warehouse comprising an enclosure consisting of walls, a floor and a roof, a duct means for passing a drying atmosphere through the warehouse in heat and mass transfer relationship with said frozen products, a desiccating means connected to the duct means to remove moisture from the drying atmosphere and refrigerating assembly associated with the warehouse to maintain the products in a frozen condition during dehydration whereby moisture within said products is removed by sublimation at substantially atmospheric pressure while the products are stored within the storage warehouse, and an imperforate movable wall means within the warehouse for segregating stored products from the products that are to be dried, said movable wall defining a drying compartment on one side thereof and a frozen food storage compartment on the other side thereof.

16. A warehouse for storing and drying frozen products, said warehouse comprising an enclosure consisting of walls, a floor and a roof, a duct means for passing a drying atmosphere through the warehouse in heat and mass transfer relationship with said frozen products, a desiccating means connected to the duct means to remove moisture from the drying atmosphere and a refrigerating assembly associated with the warehouse to maintain the products in a frozen condition during dehydration whereby moisture within said products is removed by sublimation at substantially atmospheric pressure while the products are stored within the storage warehouse, and a movable storage bin, said bin having inlet and outlet ducts connected thereto and communicating with the interior thereof and the means for passing a drying atmosphere to the compartment being connected to the inlet and outlet ducts of the bin.

17. The apparatus of claim 16 wherein the inlet and outlet ducts of the bin comiprse flexible and extensible hoses.

18. A warehouse for storing and drying frozen products, said warehouse comprising an enclosure consisting of walls, a floor and a roof, a duct means for passing a drying atmosphere through the warehouse in heat and mass transfer relationship with said frozen products, a desiccating means connected to the duct means to remove moisture from the drying atmosphere and a refrigerating assembly associated with the warehouse to maintain the products in a frozen condition during dehydration whereby moisture within said products is removed by sublimation at substantially atmospheric pressure while the products are stored within the storage warehouse, and wherein inlet and outlet headers are provided for introducing and removing the drying atmosphere from the warehouse, a plurality of spaced inlet and outlet ducts are connected to the inlet and outlet headers respectively and shut-off valves are provided between the ducts for supplying the drying atmosphere only to selected portions of the warehouse.

19. A warehouse for storing and drying frozen products, said warehouse comprising an enclosure consisting of walls, a floor and a roof, a duct means for passing a drying atmosphere through the warehouse in heat and mass transfer relationship with said frozen products, a desiccating means connected to the duct means to remove moisture from the drying atmosphere and a refrigerating assembly associated with the warehouse to maintain the products in a frozen condition during dehydration whereby moisture within said products is removed by sublimation at substantially atmospheric pressure while the products are stored within the storage warehouse, said desiccating means comprises a movable and portable unit having wheels thereon, inlet and outlet ducts are provided for introducing and removing the drying atmosphere therefrom, said inlet and outlet ducts being adapted to be connected to the warehouse for circulating the drying atmosphere through the warehouse and for maintaining the temperature and humidity thereof within selected limits.

20. A process for freeze-drying products having a thickness in at least one direction of less than about one-half inch at substantially atmospheric pressure comprising, providing a refrigerated warehouse, for storing chilled products that contain moisture, said warehouse having walls, a roof and a floor, a product drying zone within the warehouse for products that are to be dried during storage, providing frozen products within the drying zone, maintaining the products at a temperature which is sufficiently low to prevent melting, providing a drying atmosphere, reducing the humidity level of the drying atmosphere to maintain its dew point at a temperature below the temperature of the chilled products, maintaining the temperature of the drying atmosphere sufficiently low to prevent melting of the products, conveying the drying atmosphere to the drying zone and causing the drying atmosphere to flow in heat and mass transfer relationship with the products in the drying zone whereby the frozen products are dried during their storage period within the storage warehouse, and the product drying zone comprises a bin having imperforate walls and a duct means for introducing and removing the drying atmosphere from the bin.

References Cited

UNITED STATES PATENTS

| 2,480,954 | 9/1949 | Palmer | 34—5 |
| 3,096,163 | 7/1963 | Meryman | 34—5 |
| 3,313,032 | 4/1967 | Malecki | 34—5 |
| 3,238,638 | 3/1966 | Hamilton | 34—5 |

WILLIAM J. WYE, Primary Examiner

U.S. Cl. X.R.

34—92